Patented Apr. 1, 1930

1,752,826

UNITED STATES PATENT OFFICE

MARIE WRESCHNER AND LAURENCE FARMER LOEB, OF BERLIN, GERMANY, ASSIGNORS TO THE FIRM: CHEMISCHE FABRIK AUF ACTIEN (VORM. E. SCHERING), OF BERLIN, GERMANY

COMPOSITION OF MATTER AND METHOD OF PRODUCING SAME

No Drawing. Application filed March 4, 1926, Serial No. 92,296, and in Germany March 6, 1925.

Our invention refers to a new composition of matter capable of emitting $\beta$-rays and its particular object is to provide a preparation which is insoluble in body liquids, i. e. liquids forming part of or secreted by the human body, such preparation being adapted for use in the treatment of carcinoma. The present invention further includes the method of producing such preparation.

As is well known to those skilled in the art, the product of decomposition of elementary uranium known under the name of uranium $X_1$ emits $\beta$-rays. According to our invention we combine such uranium $X_1$ with a substance capable of binding same by adsorption and which is further substantially insoluble in body liquids. A substance which is particularly suitable for our purpose is ferric hydroxide.

In practising our invention we prefer adding to the solution of a uranium salt, for instance uranyl nitrate, which is well known to contain a certain quantity of uranium $X_1$, a ferric salt, for instance ferric chloride. To the solution is then added a strong solution of ammonium carbonate, which at first causes the precipitation of ferric hydroxide and uranyl carbonate, but when added in excess redissolves the uranyl carbonate. We add so much ammonium carbonate until the uranyl carbonate has gone into solution again. The uranium $X_1$ contained in the uranyl compound is quantitatively adsorbed by the ferric hydroxide, which is well rinsed with water and is converted into a suitable sort of suspension, preferably in an isotonic liquid such as physiological sodium chloride solution.

We have found it still more preferable to dissolve the rinsed precipitate remaining over after the treatment with ammonium carbonate in a suitable acid, preferably hydrochloric acid, to neutralize this solution preferably after having heated it to the boiling point, to thereafter once more add ammonium carbonate in excess and, if desired, to over and again repeat the same treatment with the precipitate formed. By thus proceeding we obtain a purer and less poisonous preparation.

The isotonic liquid used in the preparation of a suspension can also be replaced by solutions of such forms of sugar which are not decomposed by carcinoma ferments, and oils have also proved suitable. Of the different kinds of sugar, cane sugar has proved particularly useful.

The ferric salts used for the adsorption of the uranium $X_1$ can be replaced by other substances having similar adsorptive properties, such as for instance aluminium salts, silicic acid or carbon.

If ferric salt is employed for instance, the uranium $X_1$ is precipitated by the ammonium carbonate together with the ferric hydroxide and will adhere to the latter so firmly that it cannot be separated again from it by the excess of the precipitant nor by a body liquid.

The suspension containing the preparation above described can be conveyed to the point, where it is designed to act, by injection, and experiments on animals have shown that it is firmly retained in these points.

We wish it to be understood that we do not desire to be limited to the exact details and sequence of operations nor to the particular substances and compounds mentioned in the foregoing description except as defined in the appended claims.

We claim:—

1. As a new composition of matter, a preparation emitting $\beta$-rays comprising an adsorption product of uranium $X_1$ free from uranium and a substance which is substantially insoluble in body liquids and has adsorptive properties.

2. As a new composition of matter, a preparation emitting $\beta$-rays comprising an adsortion product of uranium $X_1$ free from uranium and ferric hydroxide.

3. The method of producing a preparation emitting $\beta$-rays comprising adding an adsorbent to a solution of an uranium salt, adding ammonium carbonate in order to precipitate uranium carbonate and redissolving the said uranium carbonate with an excess of ammonium carbonate.

4. The method of producing a preparation emitting β-rays comprising adding an adsorbent to a solution of an uranium salt, precipitating the solution so treated with an excess of ammonium carbonate so as to redissolve the uranium compound and suspending same in a suitable medium.

5. The method of producing a preparation emitting β-rays comprising adding an adsorbent to a solution of an uranium salt, precipitating the solution so treated with an excess of ammonium carbonate so as to redissolve the uranium compound and suspending same in an isotonic liquid.

6. The method of producing a preparation emitting β-rays comprising adding an adsorbent to a solution of an uranium salt, precipitating the solution so treated with an excess of ammonium carbonate so as to redissolve the uranium compound and suspending same in a physiological solution of sodium chloride.

7. The method of producing a preparation emitting β-rays comprising adding an adsorbent to a solution of an uranium salt, precipitating the solution so treated with an excess of ammonium carbonate so as to redissolve the uranium compound, dissolving the precipitate in an acid, neutralizing the solution and treating once more with an excess of ammonium carbonate.

8. The method of producing a preparation emitting β-rays comprising adding an adsorbent to a solution of an uranium salt, precipitating the solution so treated with an excess of ammonium carbonate so as to redissolve the uranium compound, dissolving the precipitate in hydrochloric acid, neutralizing the solution and treating once more with an excess of ammonium carbonate.

In testimony whereof we affix our signatures.

MARIE WRESCHNER.
LAURENCE FARMER LOEB.